Sept. 5, 1967             S. H. KOHLER            3,339,597
DUST-COLLECTING SYSTEM FOR SAW MACHINE
Filed Oct. 22, 1965
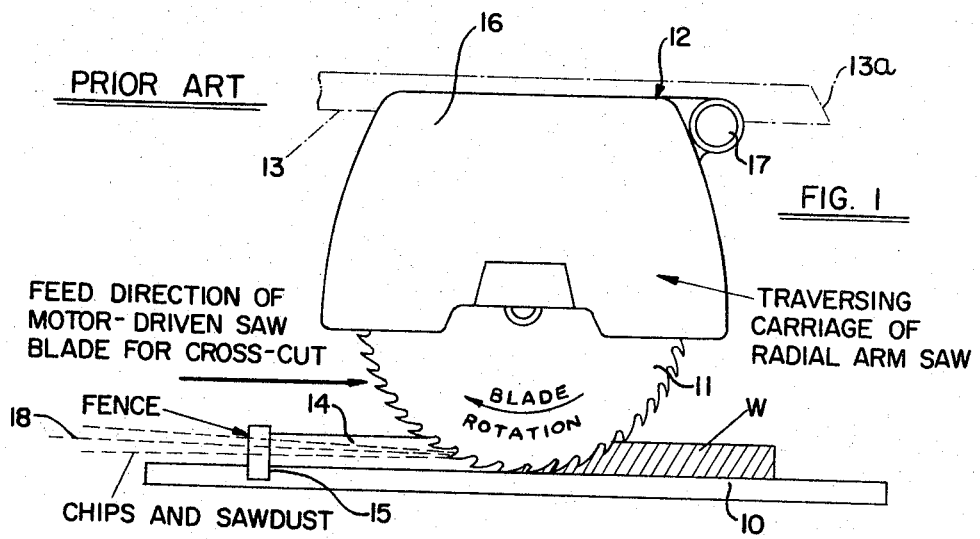
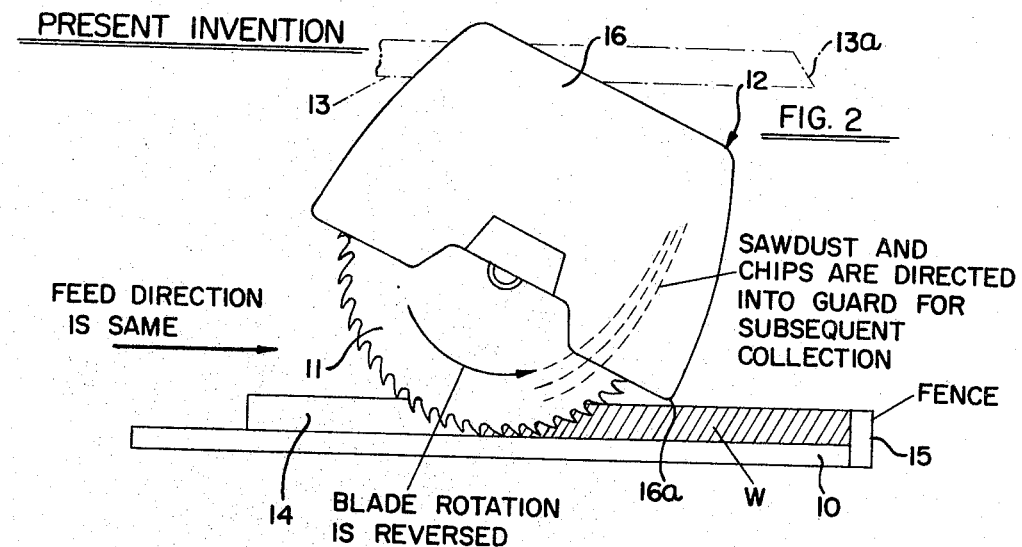
INVENTOR
SAMUEL H. KOHLER
BY *Leonard Blum*
ATTORNEY United States Patent Office 3,339,597
Patented Sept. 5, 1967

3,339,597
DUST-COLLECTING SYSTEM FOR SAW MACHINE
Samuel H. Kohler, Timonium, Md., assignor to The Black and Decker Manufacturing Company, Towson, Md., a corporation of Maryland
Filed Oct. 22, 1965, Ser. No. 500,646
5 Claims. (Cl. 143—47)

ABSTRACT OF THE DISCLOSURE

A dust-collecting system is provided for a saw machine, such as a radial arm saw. This machine has a cantilevered radial arm which slidably supports a saw carriage, and the carriage is moved from the rear to the front in making a cross-cut in the workpiece. The direction of rotation of the saw blade is reversed from its normal direction; it is now made counterclockwise, when viewed with the free end of the radial arm at the right. The blade guard has a front portion in close proximity to the workpiece, and the saw blade acts as an impeller to direct the sawdust into the guard. A suitable receptacle communicates with the guard for collecting the sawdust. As applied to a radial arm saw, the conventional fence is placed at the front of the saw table (instead of at the rear). The fence supports a longitudinal edge of the workpiece, and the arrangement allows the direction of feed (of the saw carriage) to be maintained.

The present invention relates to a dust collection system for a saw machine, and more particularly, to a system wherein the power-operated saw blade is utilized to direct the sawdust into a blade guard during the traverse of the saw blade carriage in making a cross-cut in a workpiece.

In accordance with the broad teachings of the present invention, there is herein illustrated and described in conjunction with a saw machine, a sawdust collection system which comprises, in combination, a table for supporting a workpiece, a saw blade traversable towards the front of the table in making a cut in the workpiece, supporting means at the front of the table for preventing movement of the workpiece as the cut is made, means for rotating the saw blade in a counter-clockwise direction when viewed from the side of the machine with the supporting means being at the right, blade guard means having a front portion in close proximity to the top surface of the workpiece, whereby the rotation of the saw blade directs the sawdust into the guard means, and receptacle means for collecting the sawdust directed into the guard means.

While not necessarily confined thereto, the invention has particular application to a radial arm saw machine such as is disclosed generally in the now-expired DeWalt Patent 1,528,536 issued in 1925. A machine of this type is quite well known and generally comprises a table for supporting a workpiece, a radial arm cantilever mounted above the table, the radial arm having an unsupported end at the front of the table, a carriage mounted on the radial arm, the carriage traversing from the rear of the table towards the front of the table in making a cross-cut in the workpiece, a motor-driven saw blade on the carriage, the saw blade rotating in a clockwise direction when viewed from the side of the machine with the unsupported end of the radial arm being at the right, and a fence at the rear of the machine for supporting a rear longitudinal edge of the workpiece as the cut is made by the traversing saw blade.

In the radial arm saw machines of the prior art, the sawdust is normally directed in a random fashion back towards the rear of the machine. This occurs as a result of the rotation of the saw blade as the saw blade carriage traverses towards the front of the machine in making a cross-cut in the workpiece. In a relatively short period of time, a considerable amount of sawdust and chips may accumulate at the rear of the machine.

In order to collect the sawdust on the cross-cutting operation, the prior art has resorted, for example, to the use of a vacuum hose or conduit mounted as an accessory on the saw blade carriage and having a nozzle opening in close proximity to the engagement of the blade with the work, and more particularly, to the kerf being cut in the workpiece. The vacuum conduit is in turn connected to a source of suction, such as an industrial or commercial-type vacuum cleaner which is usually mounted beneath the saw table. However, arrangements of this type, while alleviating the sawdust accumulation problem to a degree, have not been entirely satisfactory for a variety of reasons. First, their collection efficiency, that is, the percentage of the generated sawdust which is collected has sometimes been lacking, especially if the source of suction is not sufficiently powerful or is not mounted sufficiently close to the kerf. Secondly, the arrangements for mounting the vacuum hose on the traversing saw carriage have often been unwieldy, thereby interfering with the operator's use of the machine. Thirdly, the additional expense of the vacuum cleaner is a decided disadvantage.

The prior art has also suggested a dust-collection manifold mounted at the rear of the saw table; the manifold is slotted at several locations to form continuations of the usual plurality of kerfs formed in the saw table, and the manifold is in turn connected to an external source of suction. Not only is an external source of suction required, which is undesirable, but moreover, the manifold becomes less and less efficient as the number of slots is increased inasmuch as the air flow velocity is reduced.

It is an object of the present invention to reverse the normal direction of rotation of the saw blade and to utilize the rotation of the blade, somewhat in the nature of an impeller, to direct the sawdust into the blade guard for subsequent collection in a suitable receptacle. With this arrangement, the saw blade now rotates in a counter-clockwise direction when viewed from the side of the machine with the unsupported end of the radial arm being at the right. The cross-cut is made in the same manner, however, with the saw blade carriage still traversing from the rear of the machine towards the front in making the cut. For this purpose, the position of the fence is reversed from its usual position, that is, the fence is now disposed at the front of the table for supporting the front longitudinal edge of the workpiece as the cut is made. The blade guard, moreover, has a front portion in close proximity to the top surface of the workpiece, as by merely rotating the usual guard relative to the arbor for the blade, thereby facilitating the reception of the sawdust into the guard.

It is a further object to provide an improved dust-collection system for a saw machine which eliminates any necessity for a vacuum cleaner or the like, yet achieves a dust pick-up in the order of 90 to 95 percent of the generated sawdust.

These and other objects of the present invention will become apparent from a reading of the following specification, taken in conjunction with the enclosed drawings, in which:

FIGURE 1 represents, somewhat schematically, the prior art, wherein the sawdust and chips are directed in a random fashion towards the rear of the machine; and FIGURE 2 corresponds to that of FIGURE 1, but illustrates the improved dust-collection system of the present invention.

In FIGURE 1, the workpiece W is supported upon the top surface of a table 10 or other suitable support. The blade 11 is mounted on a carriage 12 which, for example, may be part of a radial arm saw machine as previously noted. The machine has a cantilever-mounted radial arm 13, shown in broken lines, and the arm has an unsupported end 13a at the front of the machine. The radial arm may be a single piece pivotably mounted at the rear of the machine, as in most designs, or it may be a "double arm" having a separate cross-arm pivotably mounted to the the end of a fixed arm. The carriage 12 supports the usual electric motor (not shown) for operating the saw blade, and the carriage is traversable from the rear of the machine (constituting the left-hand portion of FIGURE 1) to the front of the machine (constituting the right-hand portion of FIGURE 1) in making a cut or kerf 14 in the workpiece W. This is the normal cross-cut or cut-off operation of a radial arm saw. In this arrangement, the blade rotates in a clockwise direction when viewed from the side of the machine, as in FIGURE 1, with the unsupported end 13a of the radial arm being at the right. The direction of rotation of the saw blade is such as to urge the workpiece W towards the rear of the machine, and hence a suitable support or fence 15 is disposed at the rear of the machine for supporting the rear longitudinal edge of the workpiece W. A blade guard 16 is mounted on the carriage to enclose a substantial portion of the saw blade.

This is the typical prior art arrangement, with the sawdust and chips being directed by the saw blade in a random fashion back towards the rear of the machine. The prior art, as previously noted, has resorted to vacuum-actuated conduits mounted conjointly with the traversing saw carriage 12. In addition, the art has also employed a dust-collecting spout or opening 17, formed as part of the blade guard, and used in the ripping position, as distinguished from the cross-cutting usage, of the radial arm saw machine. In the ripping position, the saw carriage is locked to the radial arm at a desired adjusted position along the arm, and thereafter, the carriage is pivoted at 90° so that the saw blade is at right angles to the arm, with the work then being fed into the blade. In cross-cutting, however, the opening 17 has very little utility, if any, in collecting the sawdust.

The improvement in the art is illustrated in FIGURE 2. Here, the rotation of the saw blade 11 is reversed, that is, the blade now rotates in a counter-clockwise direction when viewed from the side of the machine, as on the drawing, with the unsupported end of the radial arm, again, being at the right. The blade guard 16 has a front portion 16a in close proximity to the top surface of the workpiece W. This may be accomplished, for example, by a specially-formed blade guard, or else by merely rotating or tilting the existing guard as shown in FIGURE 2. In one practical embodiment, the front portion 16a of the guard is disposed approximately 1/32" from the top surface of the workpiece; and this provides a convenient means for preventing the board from kicking-up towards the operator, hence provides an added safety factor. The fence 15 is now at the front of the machine and now supports the front longitudinal edge of the workpiece W. Any suitable fence means (or other supporting means) may be used in order to prevent movement of the workpiece as the cut is made, and the fence 15 shown in FIGURE 2 is designed so as to avoid any interference with the traversing saw blade and its carriage. The cut is still made in the same manner, that is, the saw carriage (and blade) still traverses from the rear of the machine to the front of the machine in making the cut.

With this improved arrangement, the rotating saw blade now directs the chip and sawdust into the blade guard 16 for subsequent collection in a suitable receptacle. The blade guard may be especially designed for maximizing the air flow pattern, hence maximizing the dust pick-up efficiency. The receptacle may comprise a bag or can in the usual supporting cabinet or bench for the radial arm saw machine, with the receptacle having a suitable conduit for communication with the guard. No vacuum cleaner or other external source of suction is required, yet tests have shown the dust pick-up to be quite remarkable in operation; for example, with a suitably designed blade guard, approximately 90% (and sometimes more) of the generated sawdust is picked up with the present invention.

Obviously, many modifications may be made without departing from the basic spirit of the present invention; and accordingly, within the scope of the appended claims, the invention may be practiced other than has been specifically described herein.

I claim:
1. In a saw machine, a sawdust collection system, comprising:
  (a) a table for supporting a workpiece;
  (b) a saw blade traversable towards the front of the table in making a cut in the workpiece;
  (c) supporting means at the front of the table for preventing movement of the workpiece as the cut is made;
  (d) means for rotating the saw blade in a counter-clockwise direction when viewed from the side of the machine with the supporting means being at the right;
  (e) blade guard means having a front portion in close proximity to the top surface of the workpiece;
  (f) whereby the rotation of the saw blade directs the sawdust into the guard means; and
  (g) receptacle means for collecting the sawdust directed into the guard means.

2. In a radial arm saw machine, a sawdust collection system, comprising:
  (a) a table for supporting a workpiece;
  (b) a cantilevered radial arm above the table, the arm having an unsupported end at the front of the table;
  (c) a carriage slidably mounted on the radial arm, the carriage being movable towards the unsupported end of the radial arm in making a cross-cut in the workpiece;
  (d) a power-operated saw blade on the carriage;
  (e) means for rotating the saw blade in a counter-clockwise direction when viewed from the side of the machine with the unsupported end of the radial arm being at the right;
  (f) blade guard means having a portion in close proximity to the top surface of the workpiece, whereby the rotation of the saw blade directs the sawdust into the guard means; and
  (g) receptacle means communicating with the guard means for receiving the sawdust directed by the blade into the guard means.

3. In a radial arm saw machine, a sawdust collection system, comprising:
  (a) a table for supporting a workpiece;
  (b) a cantilevered radial arm above the table, the arm having an unsupported end at the front of the table;
  (c) a saw blade, and means supporting the saw blade for movement from the rear of the table to the front of the table in making a cut in the workpiece;
  (d) power-operated means for rotating the saw blade in a counter-clockwise direction when viewed from the side of the machine with the unsupported end of the radial arm being at the right;
  (e) blade guard means having a front portion in close proximity to the top surface of the workpiece;
  (f) whereby the rotation of the saw blade directs the sawdust into the guard means;
  (g) receptacle means for collecting the sawdust directed into the guard means; and
  (h) supporting means at the front of the table for preventing movement of the workpiece as the cut is made.

4. In a radial arm saw machine, wherein a motor-driven saw blade is disposed on a carriage which is mounted on a radial arm, the radial arm being cantilever mounted above a table upon which the workpiece is supported, the radial arm having an unsupported end at the front of the table, the carriage being moved from the rear of the machine towards the front of the machine in making a cross-cut in the workpiece, the saw blade being normally rotated in a clockwise direction when viewed from the side of the machine with the unsupported end of the radial arm being at the right, whereby the sawdust is normally directed in a random fashion back towards the rear of the machine, the improvement in sawdust collection means, which comprises:

(a) means for reversing the direction of rotation of the saw blade, whereby the saw blade rotates in a counter-clockwise direction;

(b) blade guard means including a front portion thereof in close proximity to the top surface of the workpiece, whereby the sawdust is directed by the saw blade into the guard means; and (c) receptacle means for collecting the sawdust directed into the guard means.

5. In a radial arm saw machine, wherein a motor-driven saw blade is disposed on a carriage which is mounted on a radial arm, the radial arm being cantilever mounted above a table upon which the workpiece is supported, the radial arm having an unsupported end at the front of the table, the carriage being moved from the rear of the machine towards the front of the machine in making a cross-cut in the workpiece, and the saw blade being normally rotated in a clockwise direction when viewed from the side of the machine with the unsupported end of the radial arm being at the right, whereby the sawdust is normally directed in a random fashion back towards the rear of the machine, the improvement in sawdust collection means, which comprises:

(a) means for reversing the direction of rotation of the saw blade, whereby the blade rotates in a counter-clockwise direction;

(b) means mounted on the carriage adjacent the saw blade for receiving the sawdust directed by the reversely-rotated blade; and (c) fence means at the front of the machine for supporting a longitudinal edge of the workpiece.

References Cited
UNITED STATES PATENTS 2,623,554 12/1952 Schutz _____ 143—157
2,839,102 6/1958 Kido _____ 143—157
3,123,111 3/1964 Mattson _____ 143—157

ANDREW R. JUHASZ, *Primary Examiner.*

W. D. BRAY, *Assistant Examiner.*